US011614522B2

(12) United States Patent
Mordechai et al.

(10) Patent No.: US 11,614,522 B2
(45) Date of Patent: Mar. 28, 2023

(54) SYSTEM AND METHOD FOR TIME OF FLIGHT MEASUREMENT BASED UPON TIME MODULATED POLARIZATION STATE ILLUMINATION

(71) Applicant: GM GLOBAL TECHNOLOGY OPERATIONS LLC, Detroit, MI (US)

(72) Inventors: Emanuel Mordechai, Mishmarot (IL); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 823 days.

(21) Appl. No.: 16/546,932

(22) Filed: Aug. 21, 2019

(65) Prior Publication Data
US 2021/0055389 A1 Feb. 25, 2021

(51) Int. Cl.
*G01S 7/4865* (2020.01)
*G01S 7/499* (2006.01)
*G01S 17/14* (2020.01)
*G01S 17/26* (2020.01)
*G05D 1/00* (2006.01)
*G01S 17/00* (2020.01)

(52) U.S. Cl.
CPC ............ *G01S 7/4865* (2013.01); *G01S 7/499* (2013.01); *G01S 17/14* (2020.01); *G01S 17/26* (2020.01); *G05D 1/0088* (2013.01)

(58) Field of Classification Search
USPC ........................................................ 342/188
See application file for complete search history.

(56) References Cited

U.S. PATENT DOCUMENTS

| 5,157,451 A | * | 10/1992 | Taboada | G01S 7/499 348/262 |
| 6,762,713 B1 | * | 7/2004 | McMillan | G01S 7/024 342/188 |
| 10,816,649 B1 | * | 10/2020 | Keyser | G01S 7/499 |

FOREIGN PATENT DOCUMENTS

| EP | 0911645 B1 | * | 6/2005 | ............ G01S 7/499 |
| FR | 2694415 A1 | * | 2/1994 | ........... G01S 17/931 |

(Continued)

OTHER PUBLICATIONS

"Polarized Light and the Stokes Parameters"; no author given; no date given; retrieved Nov. 7, 2022 from UVIC.CA; 22 pages; University of Victoria; Greater Victoria, British Columbia, Canada. (Year: 2022).*

*Primary Examiner* — Bernarr E Gregory
(74) *Attorney, Agent, or Firm* — Lorenz & Kopf LLP (57) ABSTRACT

A method for measuring a distance to a target based upon time modulated polarization state illumination is provided. The method includes: transmitting a time varying polarized light beam toward the target; capturing, at a plurality of subpixel regions of a receiver, a reflected time varying polarized light beam that has been reflected off of the target; generating a plurality of polarization signals for each subpixel region that are indicative of the polarization state of the captured reflected light beam in the subpixel region; calculating a time difference between the transmitted time varying polarized light beam and the captured reflected light beam by comparing the polarization state of the captured reflected light beam with a polarization state of the transmitted time varying polarized light beam; and calculating the distance by multiplying the calculated time difference with the speed of light.

20 Claims, 9 Drawing Sheets

(56) References Cited

FOREIGN PATENT DOCUMENTS

GB             919368 A   *   2/1963   ............. G01S 17/08
KR       101424665 B1  *   8/2014   ............. G01S 17/08

* cited by examiner

SYSTEM AND METHOD FOR TIME OF FLIGHT MEASUREMENT BASED UPON TIME MODULATED POLARIZATION STATE ILLUMINATION

TECHNICAL FIELD

The technology described in this patent document relates generally to perception systems and more particularly to perception systems that measure distances based on characteristics of reflected light beam return signals.

Vehicle perception systems have been introduced into vehicles to allow a vehicle to sense its environment and in some cases to allow the vehicle to navigate autonomously or semi-autonomously. Sensing devices that may be employed in vehicle perception systems include radar, lidar, other laser devices, image sensors, and others.

While recent years have seen significant advancements in vehicle perception systems, such systems might still be improved in a number of respects. For example, lidar operates on the time of flight principle by sending a laser pulse in a narrow beam towards an object and directly measuring the time taken by the pulse to be reflected off the target and returned to the sender. The distance (D) between points A and B may be determined from the following equation: $D=\frac{1}{2} ct$, where c is the speed of light and t is the amount of time for the round-trip between A and B. This technique requires highly accurate direct time measurements and due to the speed of light this technique may be limited for high precision measurements.

Accordingly, it is desirable to provide systems and methods for determining the time of flight of light beams that do not require direct time measurements. Furthermore, other desirable features and characteristics of the present invention will become apparent from the subsequent detailed description of the invention and the appended claims, taken in conjunction with the accompanying drawings and the background of the invention.

SUMMARY

Systems and methods for indirectly measuring the time of flight of light beams for use in determining the distance to a target are provided. In one embodiment, a distance measuring system for measuring the distance to a target based is provided. The distance measuring system includes a transmitter configured to transmit a time varying polarized light beam toward the target; and a receiver configured to capture, at a plurality of subpixel regions of the receiver, a reflected time varying polarized light beam that has been reflected off of the target, wherein the receiver is further configured to generate a plurality of polarization signals for each subpixel region that are indicative of the polarization state of the captured reflected light beam in the subpixel region. The distance measuring system further includes a controller configured to calculate a time difference between the transmitted time varying polarized light beam and the captured reflected light beam by comparing the polarization state of the captured reflected light beam with a polarization state of the transmitted time varying polarized light beam. The controller is further configured to determine a distance between the target and the receiver by multiplying the calculated time difference with one half of the speed of light.

In one embodiment, the transmitter includes an illuminating source for emitting linearly polarized light.

In one embodiment, the transmitter further includes a beam shaping lens for directing the linearly polarized light emitted by the illuminating source.

In one embodiment, the illuminating source includes a laser.

In one embodiment, the transmitter is further configured to modify the polarization state of the linearly polarized light to a time varying polarization state.

In one embodiment, the transmitter further includes a polarization modulator for modifying the polarization state of the linearly polarized light to a time varying polarization state.

In one embodiment, the polarization modulator includes an electro-optic modulating element (e.g., Pockel cell) for modifying the polarization state of the linearly polarized light to a time varying polarization state.

In one embodiment, the transmitter further includes a polarization modulator controller configured to control the polarization modulator to modify the polarization state of the linearly polarized light to a time varying polarization state in accordance with a time varying voltage control signal provided by the polarization modulator controller.

In one embodiment, the illumination source (e.g., VCSEL) is configured to be modulated directly by an RF source for modifying the polarization state of the linearly polarized light to a time varying polarization state.

In one embodiment, the time varying polarization state is a time varying elliptical polarization state.

In one embodiment, the receiver includes a sensor array having a plurality of polarizing filters per subpixel region for generating the polarization signals that are indicative of the polarization state of the captured reflected light beam.

In one embodiment, the receiver further includes an imaging lens for focusing the captured reflected light beam on the sensor array.

In one embodiment, each polarizing filter is for use with a pixel in a subpixel region.

In one embodiment, the polarizing filters include at least three polarizing filters for passing polarized light to sensors in the sensor array at the polarization angle associated with the polarization filter.

In one embodiment, the polarizing filters include at least three of a first filter (e.g., 0 degree polarizing filter) for passing horizontally polarized light, a second filter (e.g., 45 degree polarizing filter) for passing 45 degree polarized light, a third filter (e.g., 90 degree polarizing filter) for passing vertically polarized light, and a fourth filter (e.g., 135 degree polarizing filter) for passing 135 degree polarized light.

In one embodiment, the plurality of polarization signals for each subpixel region includes at least three of a first polarization signal that is indicative of the level of horizontally polarized light sensed in the subpixel region, a second polarization signal that is indicative of the level of 45 degree polarized light sensed in the subpixel region, a third polarization signal that is indicative of the level of vertically polarized light sensed in the subpixel region, and a fourth polarization signal that is indicative of the level of 135 degree polarized light sensed in the subpixel region.

In one embodiment, the controller is configured to calculate Stokes parameters from relationships between the polarization signals measured in each subpixel region.

In one embodiment, the controller is further configured to calculate an angle of polarization (AOP) in each subpixel region of the captured reflected light beam using Stokes parameters.

In one embodiment, the AOP is equal to ½ tan−1[s2/s1], wherein s2=P45−P135 and S1=Ph−Pv, wherein P45 is proportional to a second polarization signal that is indicative of the level of 45 degree polarized light sensed in the subpixel region, P135 is proportional to a fourth polarization signal that is indicative of the level of 135 degree polarized light sensed in the subpixel region, Ph is proportional to a first polarization signal that is indicative of the level of horizontally polarized light sensed in the subpixel region, and Pv is proportional to a third polarization signal that is indicative of the level of vertically polarized light sensed in the subpixel region.

In one embodiment, the controller is further configured to determine the time difference between the captured reflected light beam and the transmitted time varying polarized light beam by correlating the AOP of the captured reflected light beam with the transmitted time varying polarized light beam and comparing the time at which the polarization of the transmitted light beam matches the AOP of the captured light beam with the capture time of the captured light beam.

In another embodiment, a method for measuring a distance to a target based upon time modulated polarization state illumination is provided. The method includes: transmitting a time varying polarized light beam toward the target; capturing, at a plurality of subpixel regions of a receiver, a reflected time varying polarized light beam that has been reflected off of the target; generating a plurality of polarization signals for each subpixel region that are indicative of the polarization state of the captured reflected light beam in the subpixel region; calculating a time difference between the transmitted time varying polarized light beam and the captured reflected light beam by comparing the polarization state of the captured reflected light beam with a polarization state of the transmitted time varying polarized light beam; and calculating the distance by multiplying the calculated time difference with one half times the speed of light.

In one embodiment, the transmitting includes emitting linearly polarized light and modifying the polarization state of the linearly polarized light to a time varying polarization state.

In one embodiment, the modifying includes modifying the polarization state of the linearly polarized light to a time varying polarization state in accordance with a time varying voltage control signal.

In one embodiment, the time varying polarization state is a time varying elliptical polarization state.

In one embodiment, the plurality of polarization signals for each subpixel region includes at least three of a first polarization signal that is indicative of a level of horizontally polarized light sensed in the subpixel region, a second polarization signal that is indicative of a level of 45 degree polarized light sensed in the subpixel region, a third polarization signal that is indicative of a level of vertically polarized light sensed in the subpixel region, and a fourth polarization signal that is indicative of a level of 135 degree polarized light sensed in the subpixel region.

In one embodiment, the calculating a time difference includes calculating Stokes parameters from relationships between the polarization signals measured in each subpixel region.

In one embodiment, the calculating a time difference further includes calculating an angle of polarization (AOP) in each subpixel region of the captured reflected light beam using the Stokes parameters.

In one embodiment, the AOP is equal to ½ tan−1[s2/s1], wherein s2=P45−P135 and S1=Ph−Pv, wherein P45 is proportional to a second polarization signal that is indicative of the level of 45 degree polarized light sensed in the subpixel region, P135 is proportional to a fourth polarization signal that is indicative of the level of 135 degree polarized light sensed in the subpixel region, Ph is proportional to a first polarization signal that is indicative of the level of horizontally polarized light sensed in the subpixel region, and Pv is proportional to a third polarization signal that is indicative of the level of vertically polarized light sensed in the subpixel region.

In one embodiment, the calculating a time difference includes determining the time difference between the captured reflected light beam and the transmitted time varying polarized light beam by correlating the AOP of the captured reflected light beam with the transmitted time varying polarized light beam and comparing the time at which the polarization of the transmitted light beam matches the AOP of the captured light beam with the capture time of the captured light beam.

In another embodiment, a passenger carrying vehicle that includes a distance measuring system for measuring the distance to a target based upon time modulated polarization state illumination is provided. The distance measuring system is configured to: transmit a time varying polarized light beam toward the target; capture, at a plurality of subpixel regions of a receiver, a reflected time varying polarized light beam that has been reflected off of the target; generate a plurality of polarization signals for each subpixel region that are indicative of the polarization state of the captured reflected light beam in the subpixel region; calculate a time difference between the transmitted time varying polarized light beam and the captured reflected light beam by comparing the polarization state of the captured reflected light beam with a polarization state of the transmitted time varying polarized light beam; and calculate the distance by multiplying the calculated time difference with one half times the speed of light.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, lasers, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for distance measurement using time modulated polarization illumination to determine the range to an object in a region of interest. In some embodiments a laser transmitter controls a temporally modulated laser polarization state of an emitted light beam via an electro-optic modulator.

In some embodiments, an imaging sensor array with N×M pixels is provided in a receiver section. The N×M pixels may be arranged in a plurality of sub regions wherein a sub region can be made up by a 2×2 pixel region of the N×M pixels. Each sub region may have one polarizing filter per pixel, wherein each filter may be aligned in one of four fundamental directions.

In some embodiments, an initial linear polarization state of an illuminating laser can be correlated to a back reflected signal detected at a sensor array by calculating the Stokes polarization parameters per 2×2 region. The Stokes parameters combined with the measured temporal phase shift can be used to derive distance range values and various physical features of the target.

In some embodiments, a laser illumination system in combination with a polarization modulation technique are disclosed that may generate an illumination field with a time varied polarization state. The time variation can be in a frequency in the range of 100's of kHz to 10's of GHz. The polarization state can be varied from linear to circular polarization and back to linear, covering all polarization states in between.

In some embodiments, polarization filters are arranged per pixel, wherein each pixel in a set of four pixels has a unique polarization orientation (e.g., 0, 90, 45 and 135 degrees) to provide orthogonal data relative to at least one other pixel in the same sub set.

In various embodiments, the four Stokes parameters of a returned signal can be derived from the signals of the sensor array. The degree of polarization—or state of polarization—may be derived from the four Stokes parameters and can reveal information about the target surface properties, material and topography.

The subject matter described herein provides apparatus, systems, techniques and articles wherein the distance to a target can be determined by calculating the measured polarization phase shift of the returned signal and correlating it to the illumination polarization state. Improved accuracy can be achieved when combined with the direct time of flight signal. The subject matter described herein may be used for polarization modulated distance detection, target identification, material classification, and target topology, among other uses.

Figure 1A:
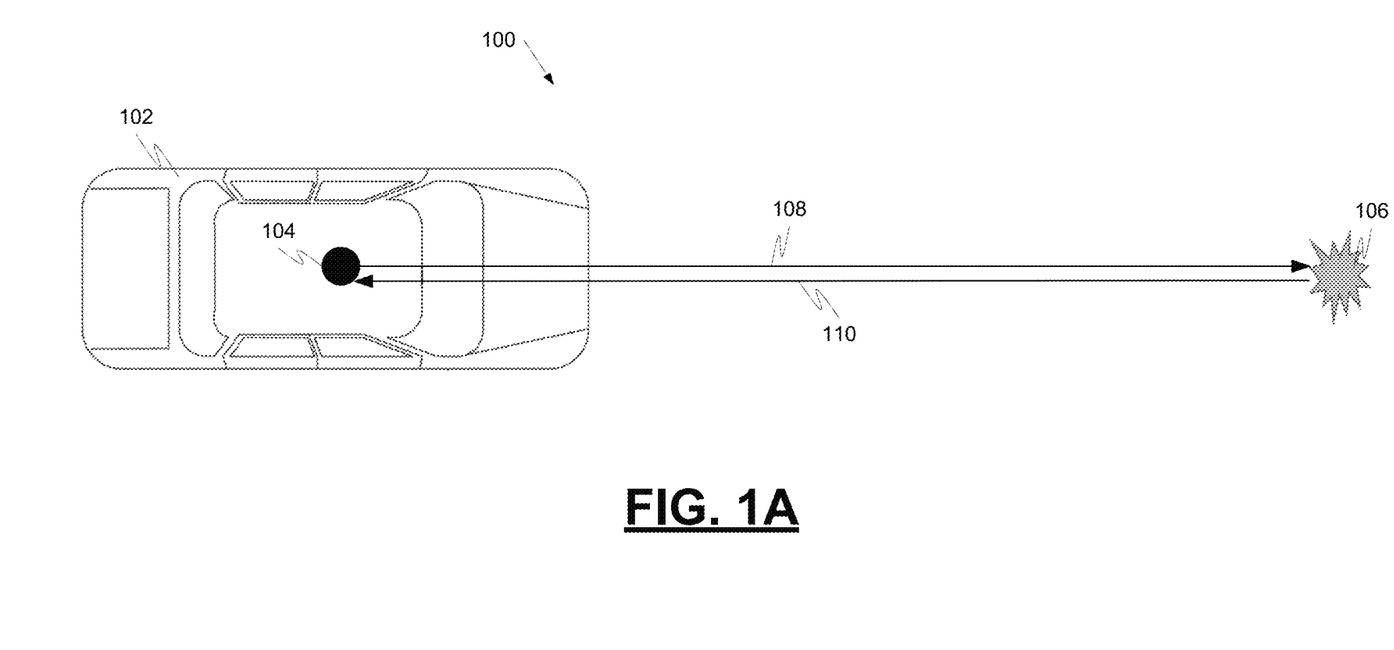
FIG. 1A is a diagram depicting an example operating environment for an example vehicle that has a perception system that allows the vehicle to sense an object, and the distance from the object to the vehicle, in accordance with various embodiments.

FIG. 1A is a diagram depicting an example operating environment 100 for an example vehicle 102 that has a perception system 104 that allows the vehicle 102 to sense an object 106 and the distance from the object 106. The example perception system 104 can compute the distance to the object 106 using a time-of-flight measurement based upon time modulated polarization state illumination. The perception system 104 includes a transmitter that can project a beam of light 108 towards the object 106 and a receiver that can sense the reflected light 110 from the object 106. The example perception system 104 is configured to determine the difference in polarization between the transmitted beam of light 108 and the received reflected beam of light 110. The sensed difference in polarization is used to determine the time of flight of the received reflected being of light 110. Because the speed of light is known, the time of flight can be converted to a distance measurement. Because the example perception system 104 uses the difference in polarization to determine the distance, it may transmit and receive beams of light continuously as opposed to sending and receiving light beams in pulses. The transmitter can project the beam of light in multiple directions thus allowing the example perception system 104 to sense the topology of an object in addition to its distance from the perception system 104. The example perception system 104 can provide for improved range determination, improved target feature identification capabilities, improved target topology sensing, and improved identification or classification of objects in its field of view.

Figure 1B:
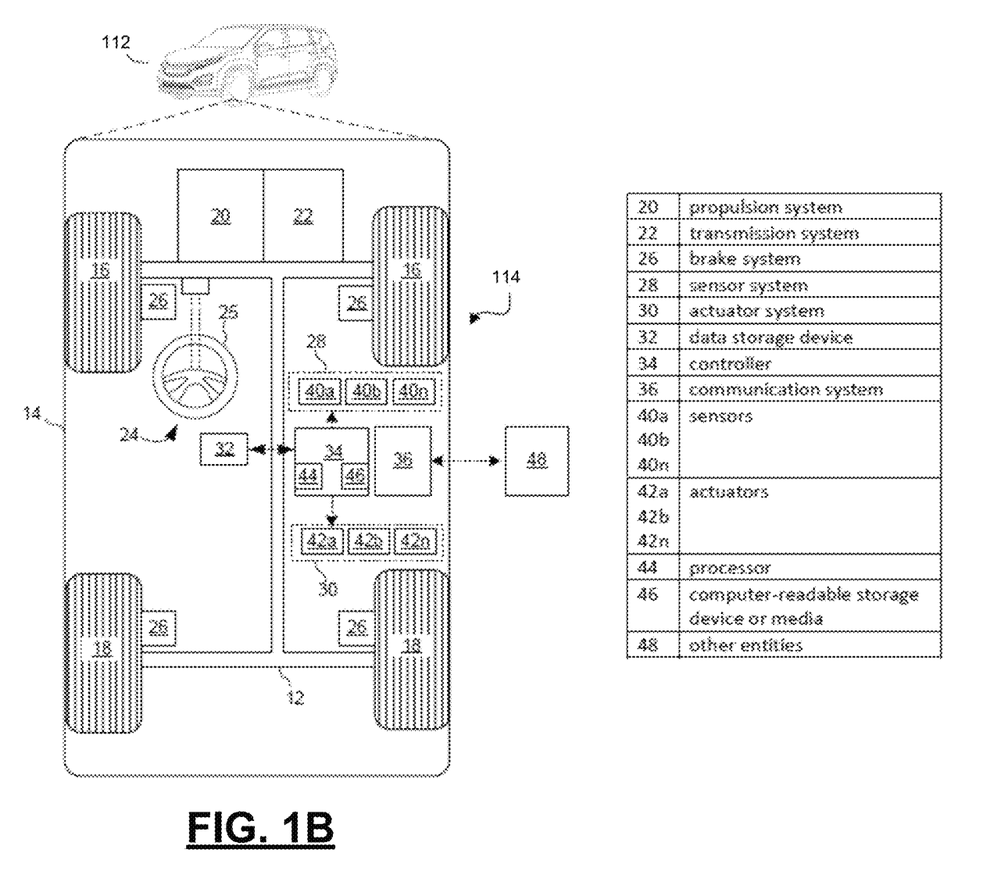
FIG. 1B is a diagram depicting an example vehicle that includes a perception system that is configured to perform time of flight measurements based upon time modulated polarization state illumination, in accordance with various embodiments.

FIG. 1B depicts an example vehicle 112 that includes a perception system 114 that is configured to perform time of flight measurements based upon time modulated polarization state illumination. As depicted in FIG. 1B, the vehicle 112 generally includes a chassis 12, a body 14, front wheels 16, and rear wheels 18. The body 14 is arranged on the chassis 12 and substantially encloses components of the vehicle 112. The body 14 and the chassis 12 may jointly form a frame. The wheels 16-18 are each rotationally coupled to the chassis 12 near a respective corner of the body 14. The vehicle 112 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 112 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 112. The data storage device 32 may be part of the controller 34, separate from the controller 34, or part of the controller 34 and part of a separate system. The controller 34 includes at least one processor 44 and a computer-readable storage device or media 46. In various embodiments, controller 34 is configured to implement a portion of the perception system 114. Although only one controller 34 is shown in FIG. 1B, embodiments of the vehicle 112 may include any number of controllers 34 that communicate over any suitable communication medium or a combination of communication mediums and that cooperate to process the sensor signals, perform logic, calculations, methods, and/or algorithms, and generate control signals to automatically control features of the vehicle 112.

Figure 2:
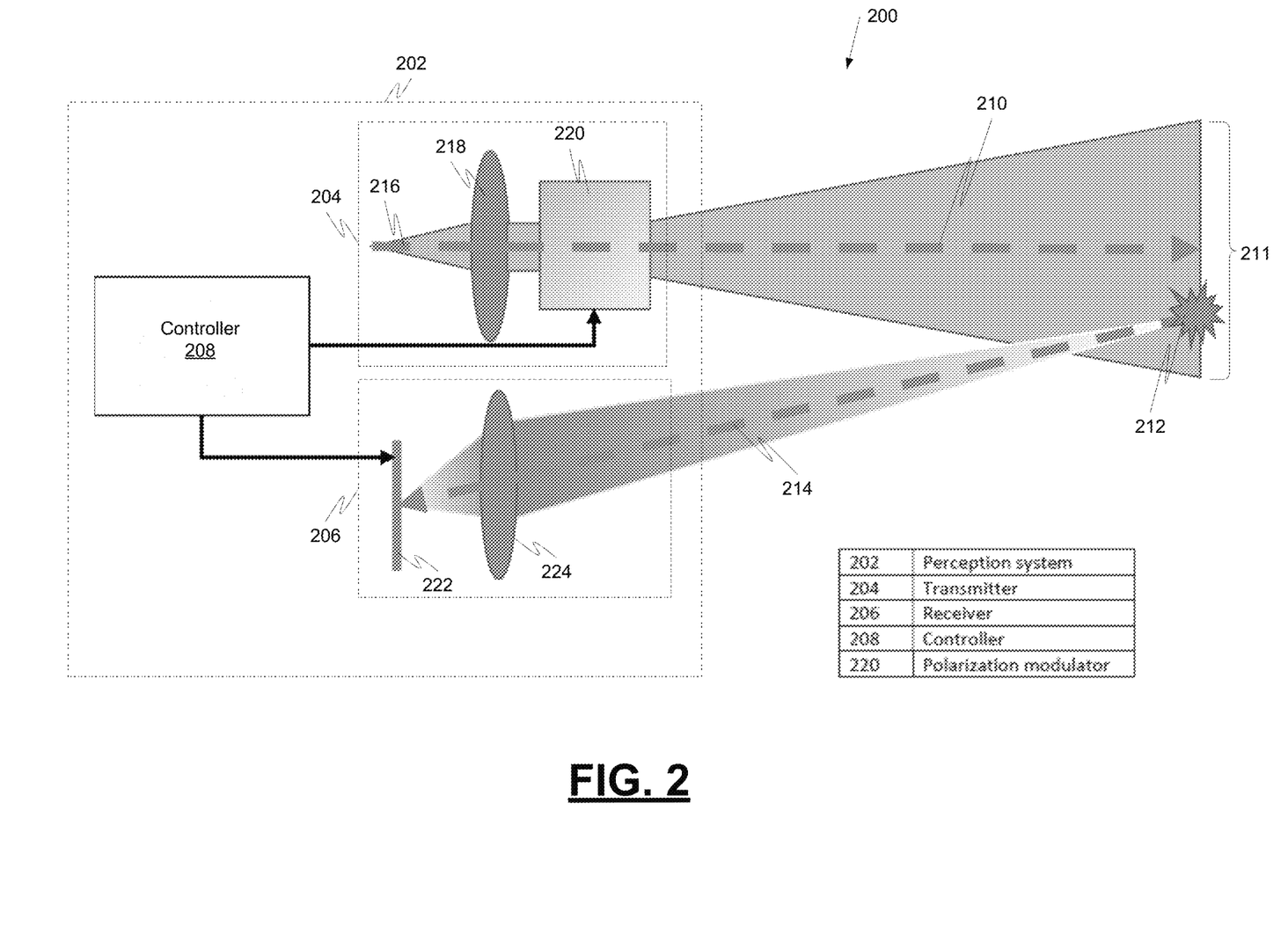
FIG. 2 is a diagram depicting an example operating environment for an example perception system that is configured to perform time of flight measurements based upon time modulated polarization state illumination, in accordance with various embodiments.

FIG. 2 is a diagram depicting an example operating environment 200 for an example perception system 202 that is configured to perform time of flight measurements based upon time modulated polarization state illumination. The example perception system 202 includes a transmitter 204, a receiver 206, and a controller 208. The transmitter 204 is configured to transmit a time varying polarized light beam 210 toward a target 212. The receiver 206 is configured to capture, at a plurality of subpixel regions of the receiver, a reflected time varying polarized light beam 214 that has been reflected off of the target and generate a plurality of polarization signals for each subpixel region, wherein the polarization signals are indicative of the polarization state of the captured reflected light beam in the subpixel region. The controller 208 is configured to calculate a time difference between the transmitted time varying polarized light beam 210 and the captured reflected light beam 214 by comparing the polarization state of the captured reflected light beam 214 with a polarization state of the transmitted time varying polarized light beam 210. The controller 208 is further configured to determine a distance between the target 212 and the receiver 206 by multiplying half the speed of light with the calculated time difference.

The example transmitter 204 includes an illuminating source 216, such as a laser, for emitting linearly polarized light and a beam shaping lens 218 for directing the linearly polarized light emitted by the illuminating source 216 over an illumination region 211. The example transmitter 204 is further configured to modify the polarization state of the linearly polarized light to a time varying polarization state. In the example shown, the transmitter includes a polarization modulator 220 for modifying the polarization state of the linearly polarized light to a time varying polarization state. In this example, the polarization modulator 220 is an electro-optic modulating element (e.g., Pockel cell) for modifying the polarization state of the linearly polarized light to a time varying polarization state. In other examples, the illumination source 216 (e.g., VCSEL) is configured to be modulated directly by an RF source for modifying the polarization state of the linearly polarized light to a time varying polarization state. In this example, the time varying polarization state is a time varying elliptical polarization state.

The example receiver 206 includes a sensor 222 with polarizing filters. The example sensor 222 and polarizing filters include a sensor array with N×M pixels, where each 2×2 pixel region is divided into a sub region. Each sub region has a plurality of polarizing filters for generating polarization signals that are indicative of the polarization state of the captured reflected light beam 214. In this example, each sub region has one polarizing filter per pixel, (i.e., for a total of 4 polarizing filters per sub region), and each filter is aligned in one of four fundamental directions (e.g., zero degrees, 45 degrees, 90 degrees, and 135 degrees). The example receiver 206 further includes an imaging lens 224 for focusing the captured reflected light beam 214 on the sensor array 222.

The controller 208 is configured to perform a correlation function calculation. The controller 208 is configured to calculate a time difference between the transmitted time varying polarized light beam 210 and the captured reflected light beam 214 by comparing the polarization state of the captured reflected light beam 214 with a polarization state of the transmitted time varying polarized light beam 210. The controller 208 is further configured to determine a distance between the target 212 and the receiver 206 by multiplying half the speed of light with the calculated time difference.

The controller 208 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which includes an ordered listing of executable instructions for implementing logical functions.

The example perception system 202 can calculate distances to objects using time modulated polarization illumination to determine the range to an object in the region of interest. The temporally modulated laser polarization state may be controlled via an electro-optic modulator 220. An imaging sensor array 222 with N×M pixels is provided, wherein each 2×2 pixel region is divided into a sub region. Each sub region has one polarizing filter per pixel, each filter aligned in one of four fundamental directions. The controller 208 is configured to correlate the initial linear polarization state of the illuminating laser to the back reflected signal 214 detected at the detector array 222 by calculating Stokes polarization parameters per 2×2 region. The Stokes parameters combined with the measured temporal phase shift can be used to derive distance range values and various physical features of the target 212.

Figure 3:
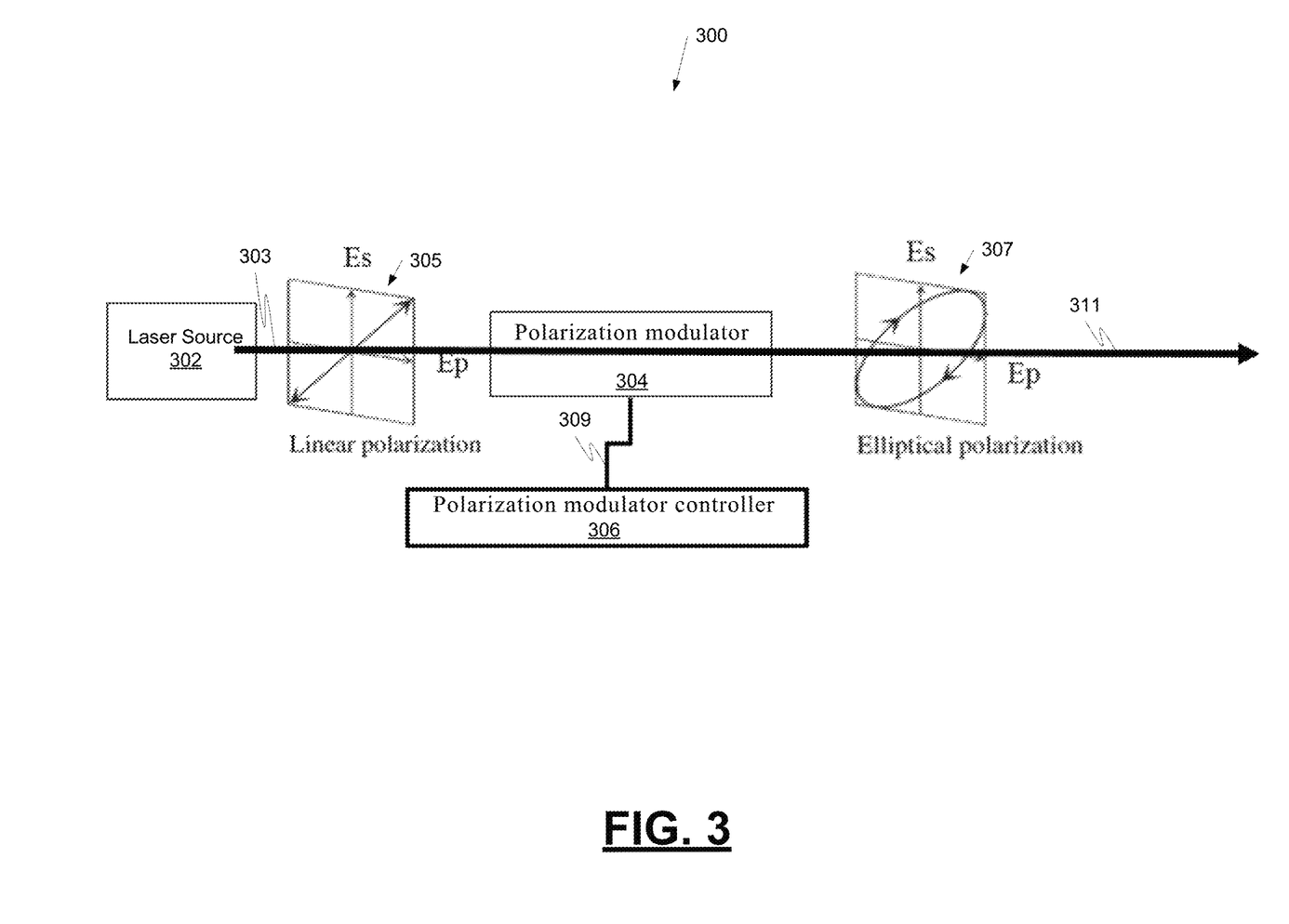
FIG. 3 is a block diagram of an example transmitter that may be used in a perception system that is configured to perform time of flight measurements based upon time modulated polarization state illumination, in accordance with various embodiments.

FIG. 3 is a block diagram of an example transmitter 300 that may be used in a perception system that is configured to perform time of flight measurements based upon time modulated polarization state illumination. The example transmitter 300 includes an illumination source 302 (e.g., laser source) that transmits light 303 with an initial polarization state that is linear 305. The example transmitter 300 further includes a polarization modulator 304. The polarization modulator 304 is configured to change the polarization state of the light 303 emitted by the laser source 302. The polarization modulator 304 is configured to convert the light 303 from the linear polarization state 305 to an elliptical polarization state 307. The polarization modulator 304 is controlled by a polarization modulator controller 306. The polarization modulator controller 306 provides a voltage modulation signal 309 that provides voltage modulation in time V(t). The modified polarization state of the light 311 changes as a function of the voltage control at the polarization modulator 304 provided by the voltage modulation signal 309.

The state of the polarization of the illumination field 311 is well defined and known at all times given that the initial state of the laser is in a linear state of polarization 305. The subsequent modulation of the polarization of the illumination beam 303 is controlled by the value of the voltage 309 driving a modulation device 304. The technique to modulate the laser polarization is varied and depends upon the type of laser selected. Some lasers require an external electro-optic element, e.g. a Pockel cell. Other laser sources like a VCSEL could be modulated directly by a RF source.

Figure 4:
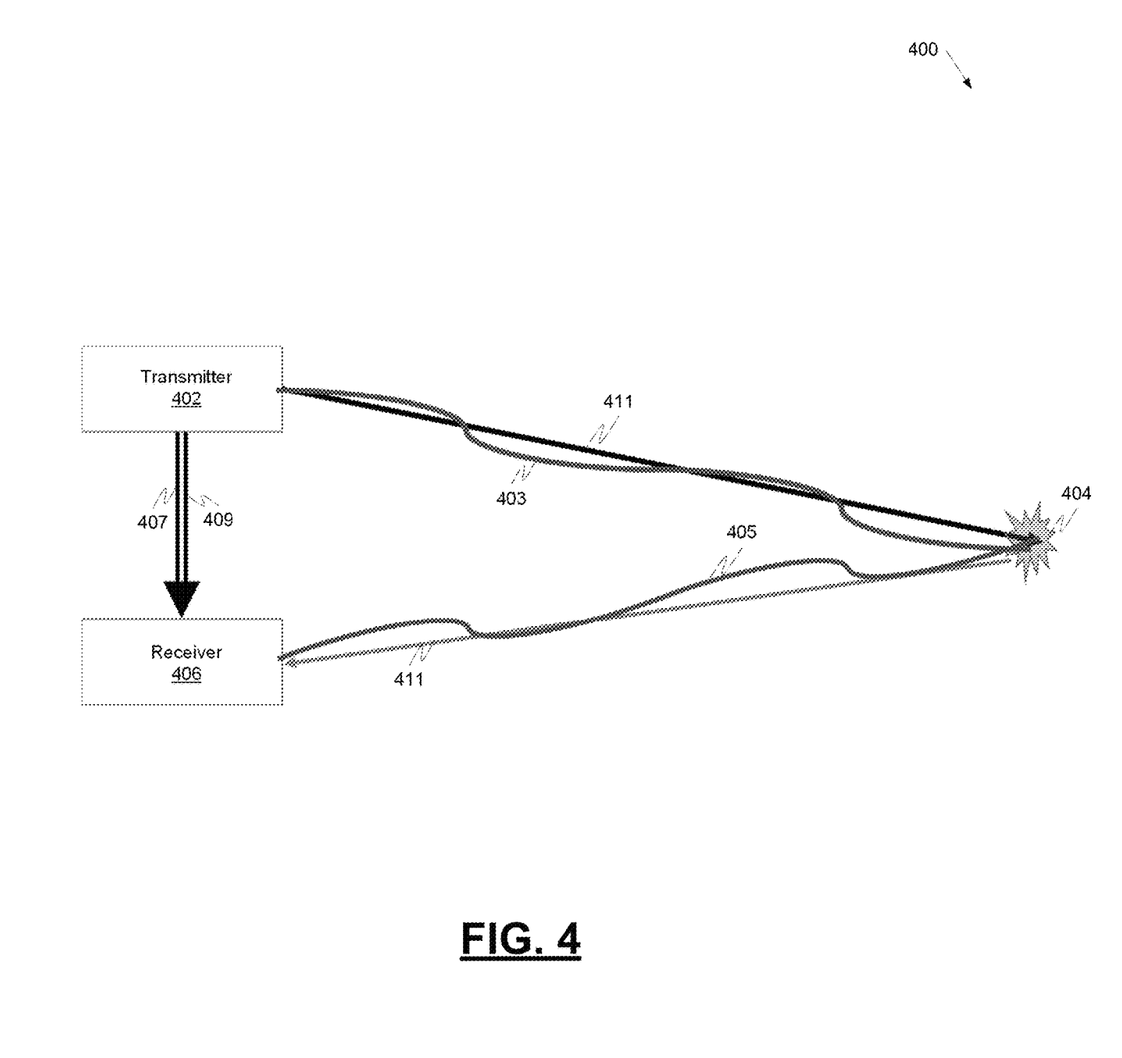
FIG. 4 is a diagram illustrating example operation of an example perception system that is configured to perform time of flight measurements based upon time modulated polarization state illumination, in accordance with various embodiments.

FIG. 4 is a diagram illustrating example operation of an example perception system that is configured to perform time of flight measurements based upon time modulated polarization state illumination. Depicted is a transmitter 402 that transmit a projected beam of light (e.g., projected modulated polarization illumination) 403 towards an object 404. The object 404 reflects a return signal 405 towards a receiver 406. The transmitter 402 also provides a timestamp 407 of its transmission and the polarization state transmission states 409 to a controller associated with the receiver 406. The intensity 411 of the projected beam 403 may decrease as it travels towards the object 404 and is reflected from the object 404 to the receiver 406. But the polarization remains unchanged from the transmitter 402, to the object 404, and back to the receiver 406. The object 404 should introduce little or no phase shift to the polarization state orientation. The detected return signal 405 and polarization state decomposition are correlated to current transmission state to determine the distance the detected return signal traveled from the object 404 to the receiver 406.

The reflected light 405 from a target 404 detected at the detector sensor in the receiver 406, assuming the target 404 does not introduce depolarization (the interaction between the object 404 and illumination does not introduce a phase shift besides that of the reflection) properties, will have a polarization state orientation (phase shift) relative to the illumination beam orientation measured at the same time. This phase shift is a property of the distance to the object 404, provided only half a period shift of polarization was induced upon the illumination beam. A greater phase shift in multiples of pi could be indistinguishable from the fundamental phase shift. However since the modulation frequency of the source is known and a time stamp of the return signal 405 is measured, the residue can be determined. The residue can be used to determine the distance in combination with the time stamp by determining the relative phase shift.

Figure 5:
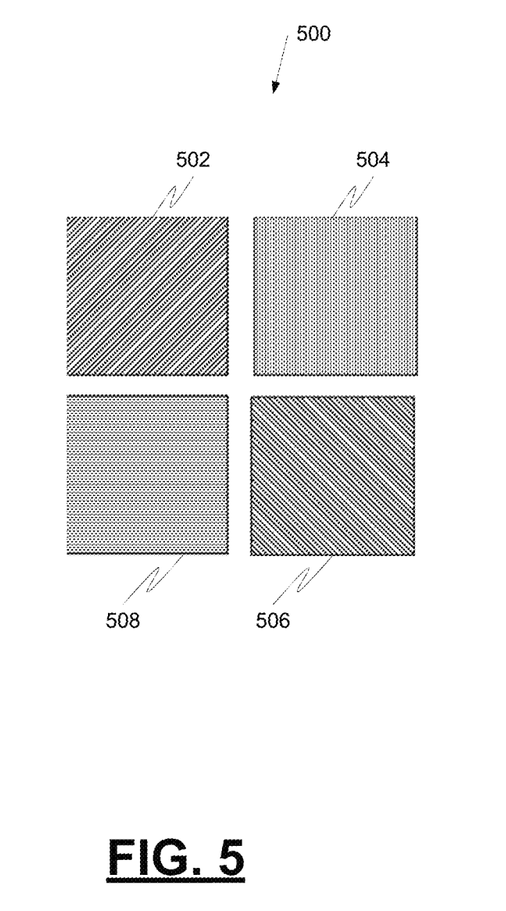
FIG. 5 is a diagram illustrating an example subregion made up by 2×2 sensors as part of a larger N×M sensor array at a receiver in an example perception system that is configured to perform time of flight measurements based upon time modulated polarization state illumination, in accordance with various embodiments.

FIG. 5 is a diagram illustrating an example 2×2 pixel region 500 that makes up a subpixel in an example N×M sensor array at a receiver in an example perception system that is configured to perform time of flight measurements based upon time modulated polarization state illumination. The example 2×2 pixel region 500 has four polarization orientation samples (502, 504, 506, 508) per subpixel, therefore the complete polarization state of a reflected beam can be determined. In the example shown, there is a polarization filter 502 with a 135° orientation for passing 135 degree polarized light, a polarization filter 504 with a 90° orientation for passing vertically polarized light, a polarization filter 506 with a 45° orientation for passing 45 degree polarized light, and a polarization filter 508 with a zero degree orientation for passing horizontally polarized light. Each pixel in the example 2×2 pixel region 500 represents one pixel in an array of N×M pixels. Other polarization filter combinations can be considered without too much loss in generality. For example, three of the four polarization filters may be used to capture the data provided by use of the four polarization filters. In this example, either the 135° polarizing filter 502 or the 45° polarizing filter 506 may be omitted.

Stokes parameters may be determined (e.g., by controller 208) by creating relationships between the signals measured at each of the four pixels (502, 504, 506, 508) in each subpixel region. After the Stokes parameters are determined, numerous parameters relating to the degree of polarization (DOP) and its related descriptors can be readily found (e.g. degree of linear polarization DOLP, degree of circular polarization DOCP, degree of elliptical polarization DOEP).

For example the state of ellipticity, eccentricity and orientation of the polarization state relative to the initial state (AOP) can also be readily derived.

The Stokes parameters S0, S1, S2 and S3 are defined as follows: S0=Ph+Pv; S1=Ph−Pv; S2=P45−P135; S3=Pr−Pl, where Pr+Pl=P45+P135=Ph+Pv. Ph could alternately be labeled P0 and Pv could be alternately labeled P90.

An angle of polarization (AOP) may be calculated (e.g., by controller 208) in each subpixel region of the captured reflected light beam using the Stokes parameters. The AOP may be determined by the following formula: AOP=½ tan−1[s2/s1], wherein s2=P45−P135 and S1=Ph−Pv. The values of Ph, Pv, P45 and P135 are all proportional to the signals detected at the relevant filter (e.g., 502, 504, 506, 508) on the sensor in the subpixel array. In particular, P45 is proportional to a polarization signal that is indicative of the level of 45 degree polarized light sensed in the subpixel region, P135 is proportional to a polarization signal that is indicative of the level of 135 degree polarized light sensed in the subpixel region, Ph is proportional to a polarization signal that is indicative of the level of horizontally polarized light sensed in the subpixel region, and Pv is proportional to a polarization signal that is indicative of the level of vertically polarized light sensed in the subpixel region.

The time difference between the captured reflected light beam and the transmitted time varying polarized light beam may be determined (e.g., by the controller 208) by correlating the AOP of the captured reflected light beam with the transmitted time varying polarized light beam and comparing the time at which the polarization of the transmitted light beam matches the AOP of the captured light beam with the capture time of the captured light beam.

If the material substrate at a target, due to its chemical structure, were to introduce an effect of depolarization—a general classification of changes in the polarization state reflected from objects due to material, surface scattering, roughness, reflected intensity related to incident polarization state and retardance—the effect of depolarization could be accounted for by correlating the detected signal to the incident polarization state of the illumination beam again through the Stokes parameters and their derivatives. Similar techniques can be made available through optical ellipsometry and optical scatterometry.

Figure 6:
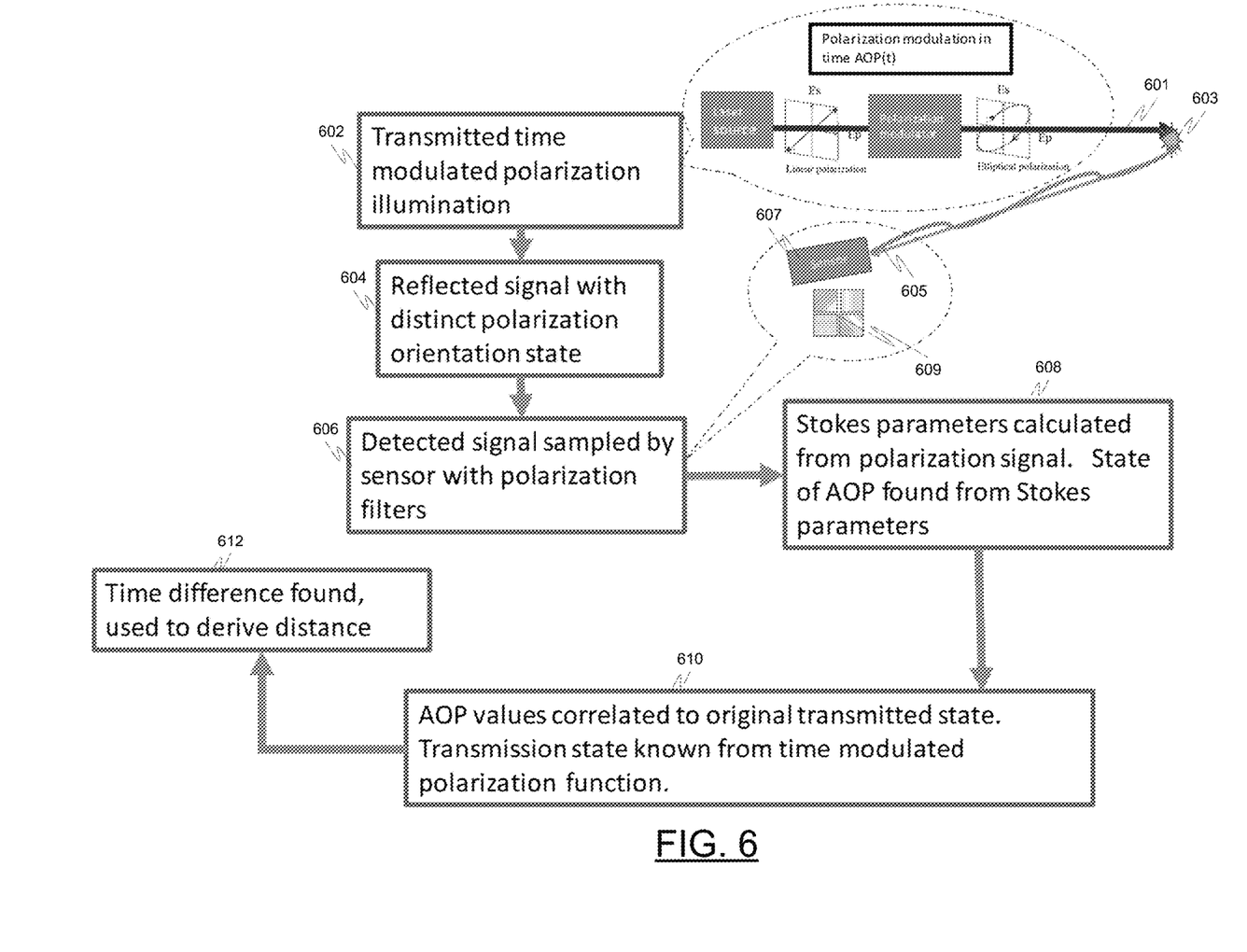
FIG. 6 is a process flow chart depicting example operation of an example perception system that is configured to perform time of flight measurements based upon time modulated polarization state illumination, in accordance with various embodiments.

FIG. 6 is a process flow chart depicting example operation of an example perception system that is configured to perform time of flight measurements based upon time modulated polarization state illumination. A transmitted time modulated polarization illumination is transmitted (operation 602). The transmitted time modulated polarization illumination 601 is reflected off of an object 603. The reflected signal 605 with distinct polarization orientation state is received and detected by a sensor 607 (operation 604). The detected signal 605 is sampled by a sensor 607 with polarization filters 609 (operation 606). The polarization filters 609 are used to generate polarization signals. Stokes parameters are calculated from the polarization signal and the state of AOP can be found from the Stokes parameters (operation 608). The AOP values are correlated to the original transmitted state, wherein the original transmission state it is known from the time modulator polarization function (operation 610). The time difference can be found from the calculated AOP values and the polarization modulation in time and the time difference may be used to derive distance (operation 612).

Figure 7A:
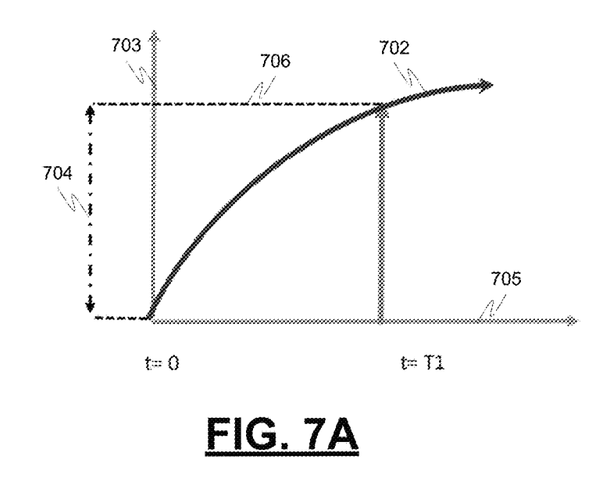
FIG. 7A is a diagram illustrating that, in an example perception system that is configured to perform time of flight measurements based upon time modulated polarization state illumination, the angle of polarization (AOP) changes as a known function of time, in accordance with various embodiments.

FIG. 7A is a diagram illustrating that, in an example perception system that is configured to perform time of flight measurements based upon time modulated polarization state illumination, the angle of polarization (AOP) 702 changes as a known function of time. The change in AOP 704 is reflected on the y-axis 703 and the change in time 706 is reflected on the x-axis 705. With the relative change in the AOP 702 measured, the amount of time that elapsed between the return signal of the AOP and when the pulse was sent out can be determined. With knowledge of the resultant time elapse, distance can be derived, for example by multiplying the time elapse times half of the speed of light.

Figure 7B:
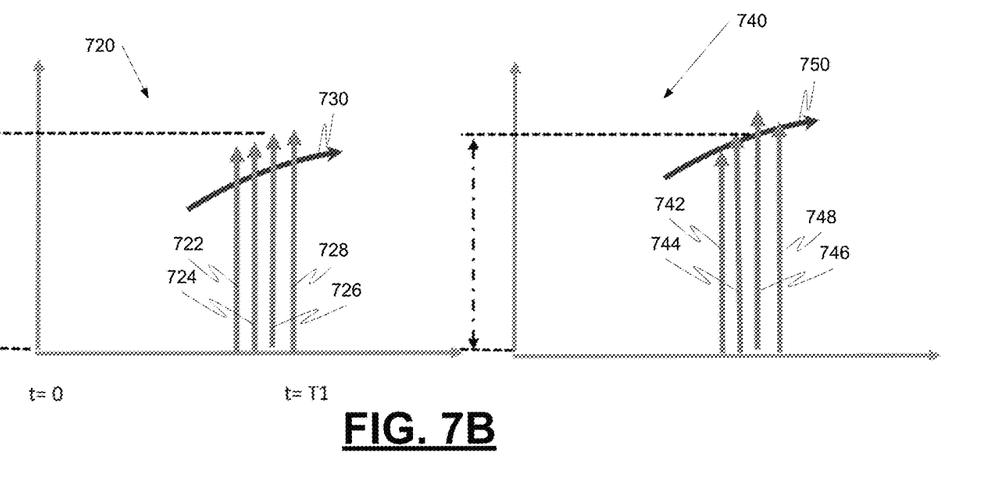
FIG. 7B is a diagram illustrating that with an example perception system, when material in a target that reflects light changes depolarization attributes, curve fitting techniques may be used to map the change in the AOP of the reflected light over time, in accordance with various embodiments.

FIG. 7B is a diagram illustrating that with an example perception system, when material in a target that reflects light changes depolarization attributes, curve fitting techniques may be used to map the change in the AOP of the reflected light over time. Reflected beams 722, 724, 726, 728 and the resulting AOP curve 730 are plotted on plot 720. In this example, the target does not introduce changes to the AOP curve 730. Reflected beams 722, 724, 726, 728 exhibit behavior expected of a material with no depolarization attributes.

Reflected beams 742, 744, 746, 748 and the resulting AOP curve 750 are plotted on plot 740. In this example, the target does introduce changes to the AOP curve 750. Reflected beams 722, 724, 726, 728 exhibit behavior expected of a material with depolarization attributes. This can result because some materials can induce an additional change to the AOP due to the material and other target factors. These additional changes to the AOP can induce a change that is not consistent with the slope of the known change in the AOP. As depicted in plot 740, the overall trend of the individual detections 742, 744, 746, 748 can be examined (e.g., by curve fitting techniques) and be made to fit a curve to identify the angle of polarization of the projected beam changes as a known function of time.

Figure 8:
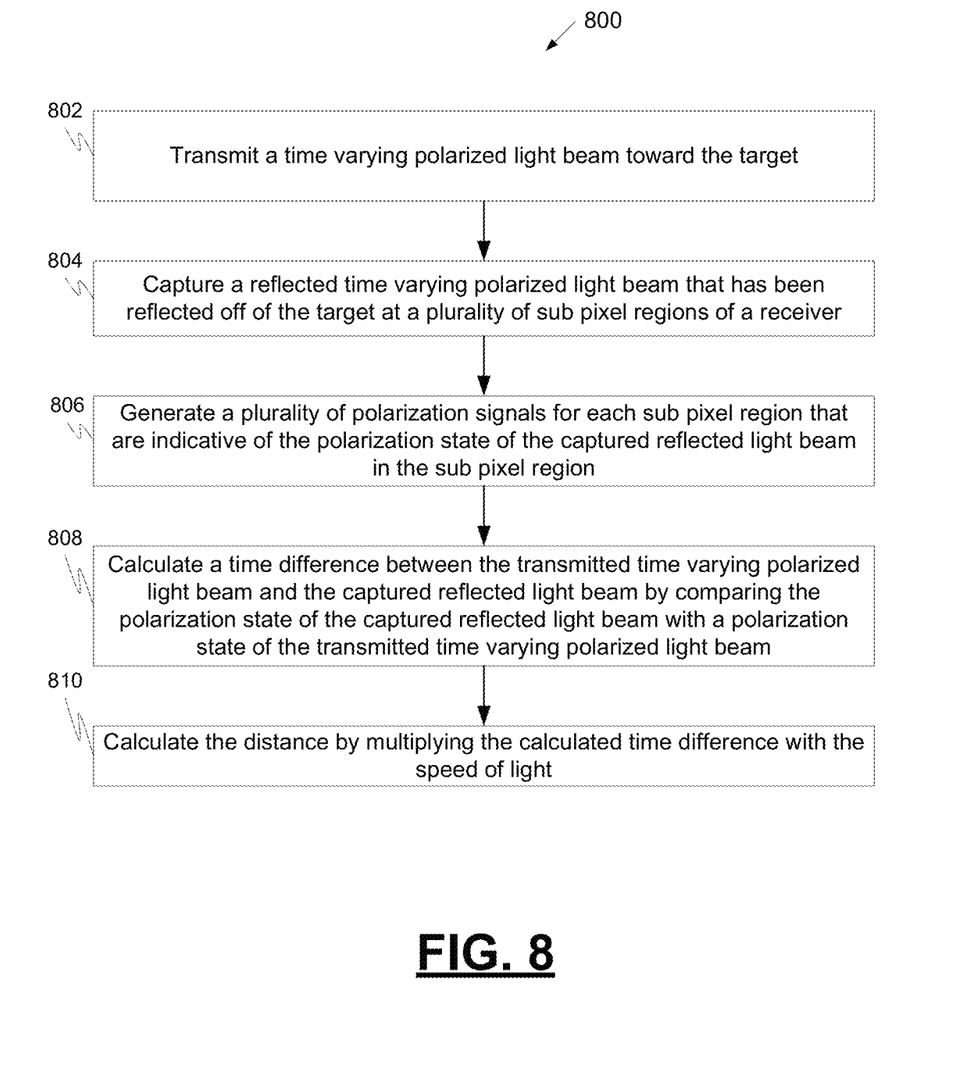
FIG. 8 is a process flow chart depicting an example process in an example perception system that is configured to measure a distance to a target based upon time modulated polarization state illumination, in accordance with various embodiments.

FIG. 8 is a process flow chart depicting an example process 800 in an example perception system that is configured to measure a distance to a target based upon time modulated polarization state illumination. The order of operation within process 800 is not limited to the sequential execution as illustrated in the figure, but may be performed in one or more varying orders as applicable and in accordance with the present disclosure.

The example process 800 includes transmitting a time varying polarized light beam toward the target (operation 802). The transmitting may include emitting linearly polarized light and modifying the polarization state of the linearly polarized light to a time varying polarization state. The modifying may include modifying the polarization state of the linearly polarized light to a time varying polarization state in accordance with a time varying voltage control signal. The time varying polarization state may be a time varying elliptical polarization state.

The example process 800 includes capturing, at a plurality of subpixel regions of a receiver, a reflected time varying polarized light beam that has been reflected off of the target (operation 804). The capturing may take place at a receiver that includes a sensor and polarizing filters. The sensor and polarizing filters may include a sensor array with N×M pixels, where each 2×2 pixel region is divided into a sub region. Each sub region may have a plurality of polarizing filters for generating the polarization signals that are indicative of the polarization state of the captured reflected light beam. In this example, each sub region has one polarizing filter per pixel, (i.e., for a total of 4 polarizing filters per sub region), and each filter is aligned in one of four fundamental directions (e.g., zero degrees, 45 degrees, 90 degrees, and 135 degrees).

The example process 800 includes generating a plurality of polarization signals for each subpixel region that are indicative of the polarization state of the captured reflected light beam in the subpixel region (operation 806). The plurality of polarization signals for each subpixel region may include at least three of a first polarization signal that is indicative of a level of horizontally polarized light sensed in the subpixel region, a second polarization signal that is indicative of a level of degree polarized light sensed in the subpixel region, a third polarization signal that is indicative of a level of vertically polarized light sensed in the subpixel region, and a fourth polarization signal that is indicative of a level of degree polarized light sensed in the subpixel region.

The example process 800 includes calculating a time difference between the transmitted time varying polarized light beam and the captured reflected light beam by comparing the polarization state of the captured reflected light beam with a polarization state of the transmitted time varying polarized light beam (operation 808). The calculating a time difference may include calculating Stokes parameters from relationships between the polarization signals measured in each subpixel region. The calculating a time difference may further include calculating an angle of polarization (AOP) in each subpixel region of the captured reflected light beam using the Stokes parameters. The AOP may be equal to ½ tan−1[s2/s1], wherein s2=P45−P135 and S1=Ph−Pv, wherein P45 is proportional to a second polarization signal that is indicative of the level of 45 degree polarized light sensed in the subpixel region, P135 is proportional to a fourth polarization signal that is indicative of the level of 135 degree polarized light sensed in the subpixel region, Ph is proportional to a first polarization signal that is indicative of the level of horizontally polarized light sensed in the subpixel region, and Pv is proportional to a third polarization signal that is indicative of the level of vertically polarized light sensed in the subpixel region. The calculating a time difference may include determining the time difference between the captured reflected light beam and the transmitted time varying polarized light beam by correlating the AOP of the captured reflected light beam with the transmitted time varying polarized light beam and comparing the time at which the polarization of the transmitted light beam matches the AOP of the captured light beam with the capture time of the captured light beam.

One example technique for calculating the time of flight makes use of the time modulation of the polarization state to determine the amount of time elapsed in the return signal. Because the modulation function is a known periodic function in time, the number of 2pi moduli that occurred can be counted and the residual difference from the return signal and next complete 2pi can be added to the count. This should provide the equivalent time of flight, compared to a direct time measurement. Because the modulation function of the polarization will be of a fixed frequency, the amount of time to a complete 2pi is known.

Another technique for calculating the time of flight that makes use of time modulation includes enforcing only one single 2pi modulation period from the vehicle light source all the way to R_max (definition of the maximum range for the sensor to measure), calculating the phase shift within that single period, and translating the phase shift to time shift (time delay). Other techniques for calculating the time may also be used.

The example process 800 includes calculating the distance by multiplying the calculated time difference with half the speed of light (operation 810).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A distance measuring system for measuring the distance to a target, the distance measuring system comprising:
a transmitter configured to transmit a time varying polarized light beam toward the target, wherein polarization of the light beam is time varying;
a receiver configured to capture, at a plurality of subpixel regions of the receiver, a reflected time varying polarized light beam that has been reflected off of the target, wherein the receiver is further configured to generate a plurality of polarization signals for each subpixel region that are indicative of the polarization state of the captured reflected light beam in the subpixel region, the receiver comprising a sensor array having a plurality of polarizing filters per subpixel region for generating the polarization signals that are indicative of the polarization state of the captured reflected light beam; and
a controller configured to calculate a time difference between the transmitted time varying polarized light beam and the captured reflected light beam by comparing the polarization state of the captured reflected light beam with a polarization state of the transmitted time varying polarized light beam, wherein the controller is further configured to determine a distance between the target and the receiver by multiplying the calculated time difference with one half of the speed of light.

2. The system of claim 1, wherein:
the transmitter comprises an illuminating source for emitting linearly polarized light; and
the transmitter is further configured to modify the polarization state of the linearly polarized light to a time varying polarization state.

3. The system of claim 2, wherein:
the transmitter further comprises a polarization modulator for modifying the polarization state of the linearly polarized light to a time varying polarization state; and
the polarization modulator comprises an electro-optic modulating element for modifying the polarization state of the linearly polarized light to a time varying polarization state.

4. The system of claim 2, wherein the time varying polarization state is a time varying elliptical polarization state.

5. The system of claim 1, wherein the polarizing filters comprise at least three polarizing filters for passing polarized light to sensors in the sensor array at the polarization angle associated with the polarization filter.

6. The system of claim 5, wherein the polarizing filters comprise at least three of a first filter for passing horizontally polarized light, a second filter for passing 45 degree polarized light, a third filter for passing vertically polarized light, and a fourth filter for passing 135 degree polarized light.

7. The system of claim 6, wherein the plurality of polarization signals for each subpixel region comprise at least three of a first polarization signal that is indicative of the level of horizontally polarized light sensed in the subpixel region, a second polarization signal that is indicative of the level of 45 degree polarized light sensed in the subpixel region, a third polarization signal that is indicative of the level of vertically polarized light sensed in the subpixel region, and a fourth polarization signal that is indicative of the level of 135 degree polarized light sensed in the subpixel region.

8. The system of claim 1, wherein the controller is configured to calculate Stokes parameters from relationships between the polarization signals measured in each subpixel region.

9. The system of claim 8, wherein the controller is further configured to calculate an angle of polarization (AOP) in each subpixel region of the captured reflected light beam using Stokes parameters.

10. The system of claim 9, wherein the AOP is equal to ½ $\tan^{-1}$ [s2/s1], wherein s2=P45−P135 and S1=Ph−Pv, wherein P45 is proportional to a second polarization signal that is indicative of the level of 45 degree polarized light sensed in the subpixel region, P135 is proportional to a fourth polarization signal that is indicative of the level of 135 degree polarized light sensed in the subpixel region, Ph is proportional to a first polarization signal that is indicative of the level of horizontally polarized light sensed in the subpixel region, and Pv is proportional to a third polarization signal that is indicative of the level of vertically polarized light sensed in the subpixel region.

11. The system of claim 9, wherein the controller is further configured to determine the time difference between the captured reflected light beam and the transmitted time varying polarized light beam by correlating the AOP of the captured reflected light beam with the transmitted time varying polarized light beam and comparing the time at which the polarization of the transmitted light beam matches the AOP of the captured light beam with the capture time of the captured light beam.

12. A method for measuring a distance to a target based upon time modulated polarization state illumination, the method comprising:
transmitting a time varying polarized light beam toward the target, wherein polarization of the light beam is time varying;
capturing, at a plurality of subpixel regions of a receiver, a reflected time varying polarized light beam that has been reflected off of the target;
generating a plurality of polarization signals for each subpixel region that are indicative of the polarization state of the captured reflected light beam in the subpixel region, wherein the receiver comprises a sensor array having a plurality of polarizing filters per subpixel region for generating the polarization signals that are indicative of the polarization state of the captured reflected light beam;
calculating a time difference between the transmitted time varying polarized light beam and the captured reflected light beam by comparing the polarization state of the captured reflected light beam with a polarization state of the transmitted time varying polarized light beam; and
calculating the distance by multiplying the calculated time difference with one half times the speed of light.

13. The method of claim 12, wherein the transmitting comprises: emitting linearly polarized light and modifying the polarization state of the linearly polarized light to a time varying polarization state.

14. The method of claim 12, wherein the plurality of polarization signals for each subpixel region comprise at least three of a first polarization signal that is indicative of a level of horizontally polarized light sensed in the subpixel region, a second polarization signal that is indicative of a level of 45 degree polarized light sensed in the subpixel region, a third polarization signal that is indicative of a level of vertically polarized light sensed in the subpixel region, and a fourth polarization signal that is indicative of a level of 135 degree polarized light sensed in the subpixel region.

15. The method of claim 12, wherein the calculating a time difference comprises calculating Stokes parameters from relationships between the polarization signals measured in each subpixel region.

16. The method of claim 15, wherein the calculating a time difference further comprises calculating an angle of polarization (AOP) in each subpixel region of the captured reflected light beam using the Stokes parameters.

17. The method of claim 16, wherein the AOP is equal to ½ $\tan^{-1}$[s2/s1], wherein s2=P45−P135 and S1=Ph−Pv, wherein P45 is proportional to a second polarization signal that is indicative of the level of 45 degree polarized light sensed in the subpixel region, P135 is proportional to a fourth polarization signal that is indicative of the level of 135 degree polarized light sensed in the subpixel region, Ph is proportional to a first polarization signal that is indicative of the level of horizontally polarized light sensed in the subpixel region, and Pv is proportional to a third polarization signal that is indicative of the level of vertically polarized light sensed in the subpixel region.

18. The method of claim 16, wherein the calculating a time difference comprises determining the time difference between the captured reflected light beam and the transmitted time varying polarized light beam by correlating the AOP of the captured reflected light beam with the transmitted time varying polarized light beam and comparing the time at which the polarization of the transmitted light beam matches the AOP of the captured light beam with the capture time of the captured light beam.

19. A passenger carrying vehicle comprising a distance measuring system for measuring the distance to a target based upon time modulated polarization state illumination, the distance measuring system configured to:
transmit a time varying polarized light beam toward the target, wherein polarization of the light beam is time varying;
capture, at a plurality of subpixel regions of a receiver, a reflected time varying polarized light beam that has been reflected off of the target;
generate a plurality of polarization signals for each subpixel region that are indicative of the polarization state of the captured reflected light beam in the subpixel region, wherein the receiver comprises a sensor array having a plurality of polarizing filters per subpixel region for generating the polarization signals that are indicative of the polarization state of the captured reflected light beam;
calculate a time difference between the transmitted time varying polarized light beam and the captured reflected light beam by comparing the polarization state of the captured reflected light beam with a polarization state of the transmitted time varying polarized light beam; and calculate the distance by multiplying the calculated time difference with one half times the speed of light.

20. The passenger carrying vehicle of claim 19, wherein the distance measuring system configured to calculate the time difference by calculating Stokes parameters from relationships between the polarization signals measured in each subpixel region.

* * * * *